United States Patent [19]

Kortan et al.

[11] 4,365,492

[45] Dec. 28, 1982

[54] RING FORMER AND CUTOFF

[75] Inventors: William A. Kortan; Donald A. Nebrig, both of Bay Village, Ohio

[73] Assignee: Intercole Bolling Corp., Cleveland, Ohio

[21] Appl. No.: 162,795

[22] Filed: Jun. 25, 1980

[51] Int. Cl.³ .............................................. B21F 11/00
[52] U.S. Cl. ............................................. 72/10; 72/14; 72/131; 72/132; 140/88
[58] Field of Search .................... 72/14, 129, 130, 131, 72/132, 135, 137, 138, 142, 11, 12, 10; 83/907; 140/88, 92.7

[56] References Cited

U.S. PATENT DOCUMENTS

| | | | |
|---|---|---|---|
| 873,430 | 12/1907 | Harter | 72/132 X |
| 1,719,250 | 7/1929 | Walstrom | 72/129 |
| 1,835,589 | 12/1931 | Bond | 72/14 |
| 2,206,068 | 7/1940 | Yoder | 72/132 X |
| 2,243,351 | 5/1941 | Lowry | 72/130 X |
| 2,948,322 | 8/1960 | Cox et al. | 72/14 |

FOREIGN PATENT DOCUMENTS

| | | | |
|---|---|---|---|
| 40-13656 | 7/1965 | Japan | 72/135 |
| 553030 | 5/1977 | U.S.S.R. | 72/132 |

*Primary Examiner*—Ervin M. Combs
*Attorney, Agent, or Firm*—Watts, Hoffmann, Fisher & Heinke Co.

[57] ABSTRACT

A ring former and cutoff utilizes a continuous ring former which causes the stock to assume the form of a helix having a number of turns. The leading end of the helix after forming a plurality of free turns passes through a drive roll set, through a stationary cutoff die and into a sizing hoop of larger diameter than those in the turns of the helix. The free end of the helix to expand within the sizing hoop. Sensors detect the expansion to energize the cutoff at the die to sever a turn of the helix with the momentary halt of the stock at the die causing the helix between the cutoff and former to expand or unwind. When the severed end of the helix is removed or falls free, the drive roll set again drives the new leading end of the helix through the cutoff die at a speed sufficient to return or wind the helix to its original condition.

50 Claims, 7 Drawing Figures

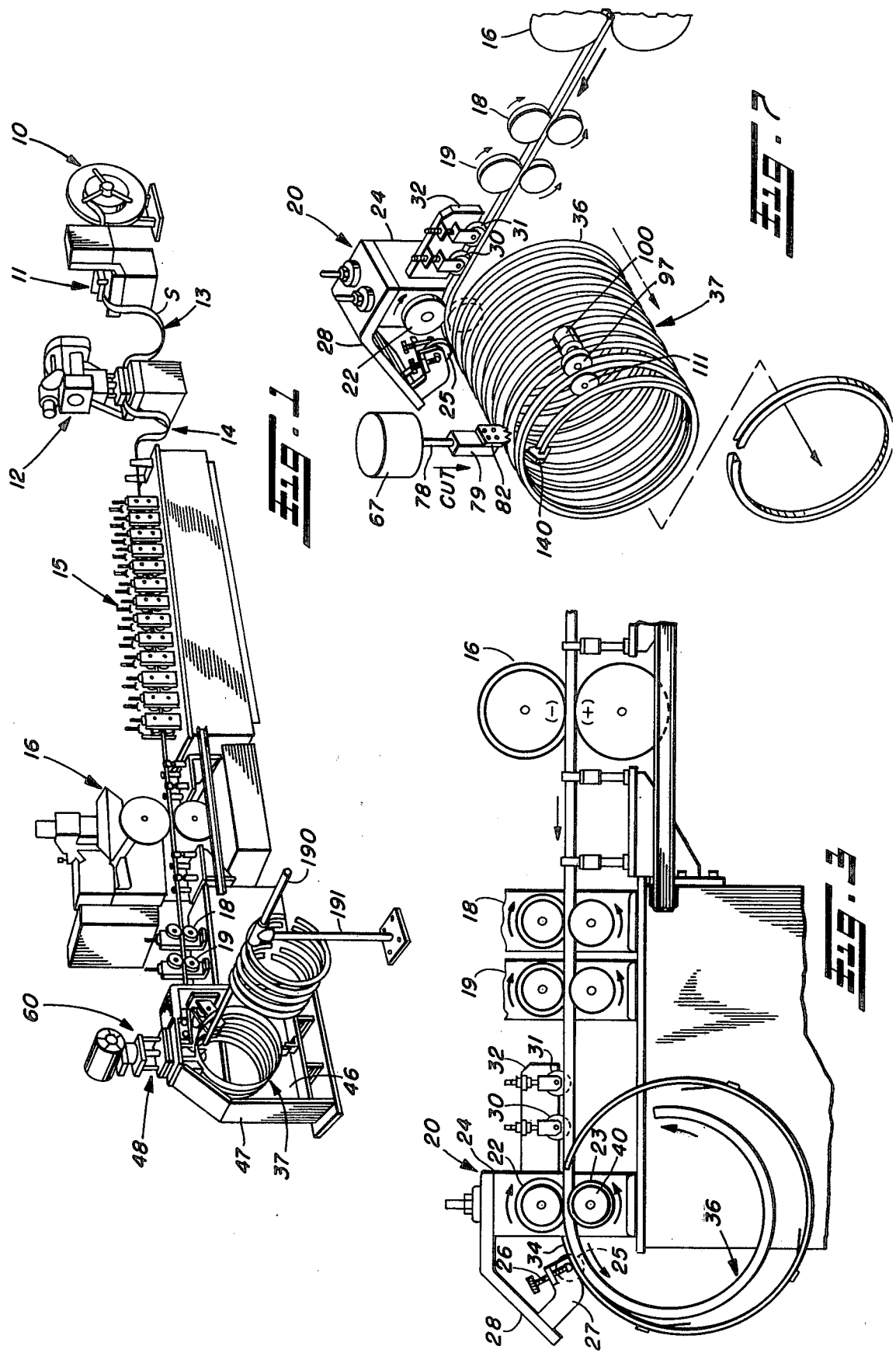

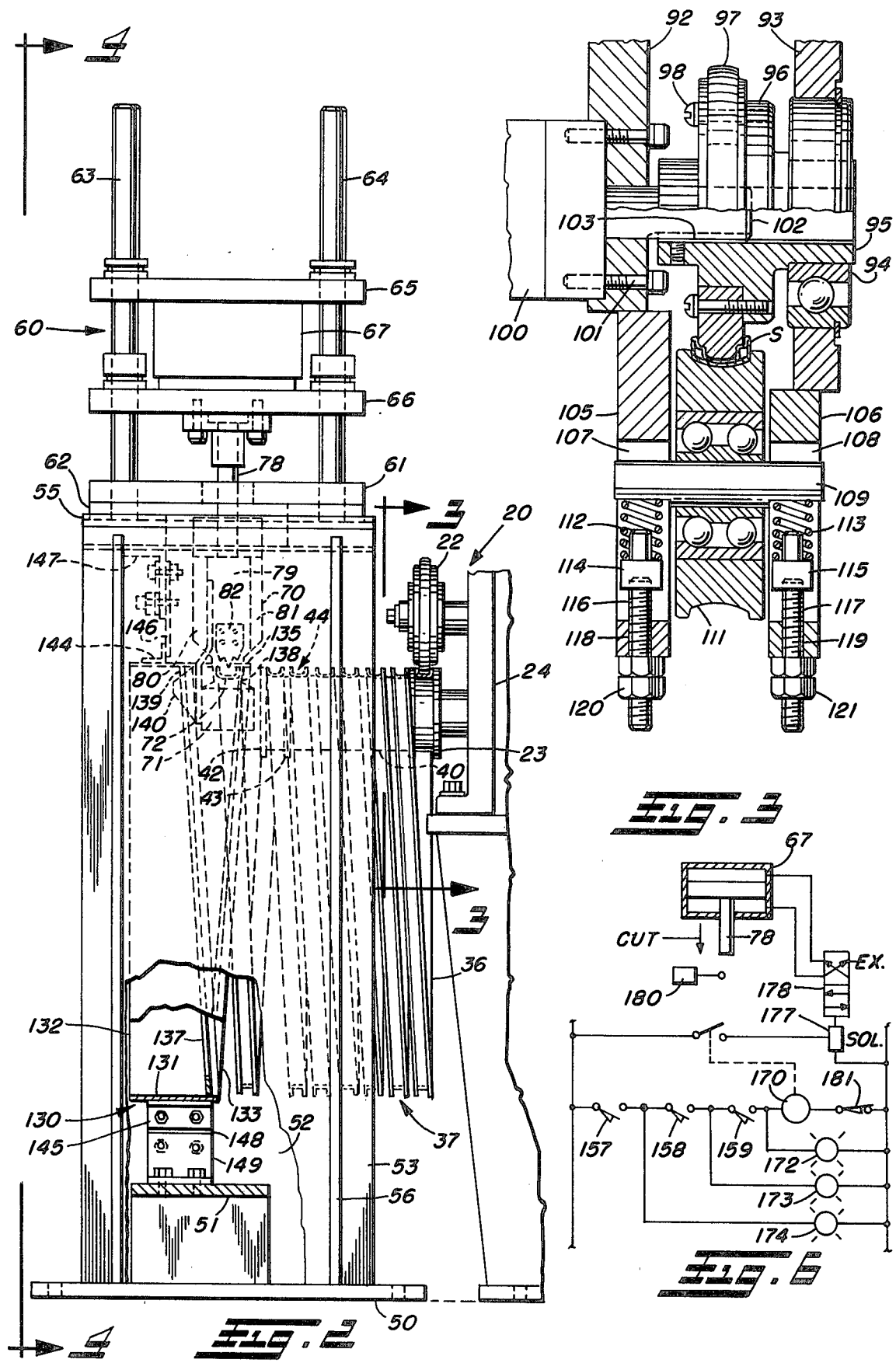

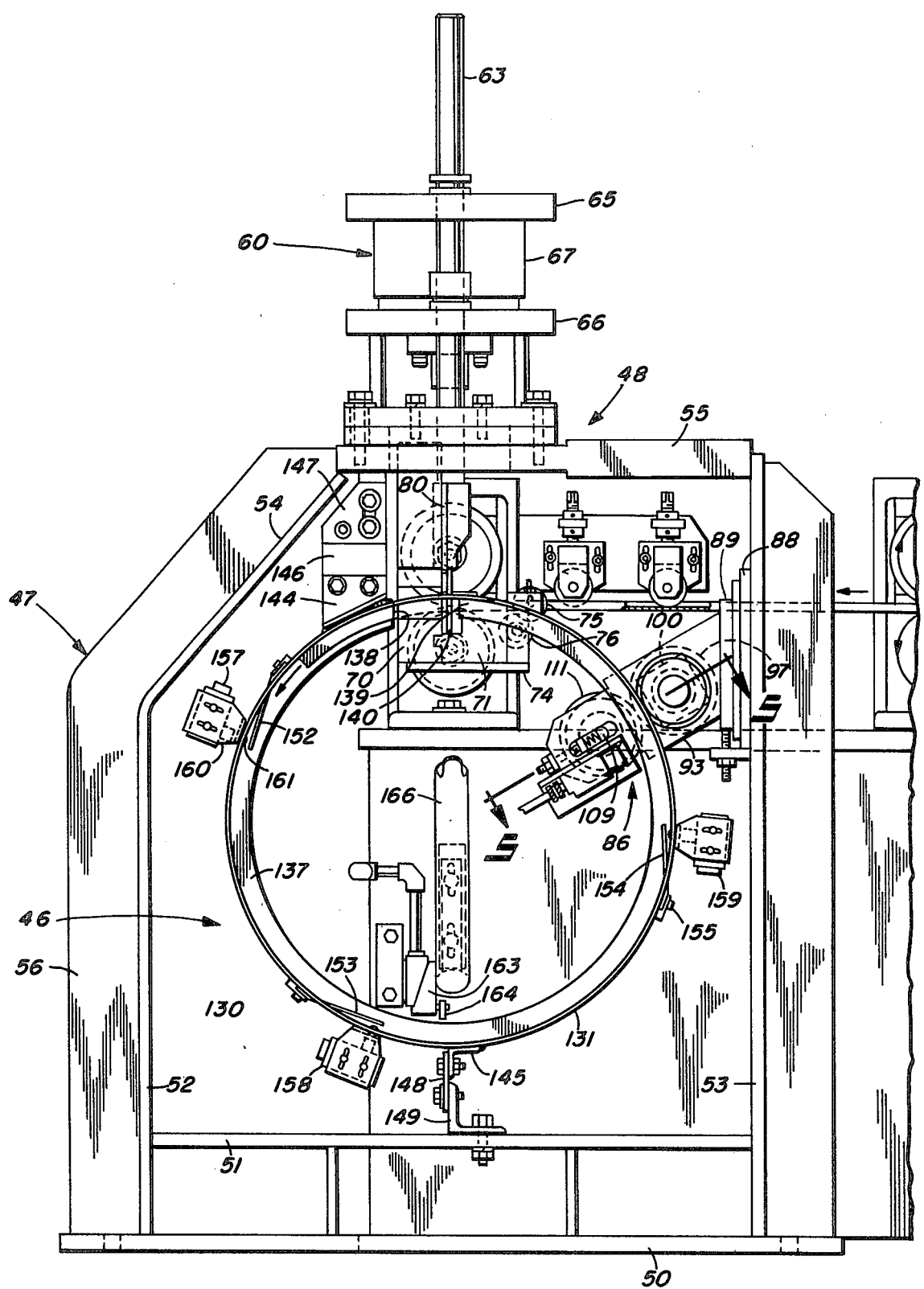

RING FORMER AND CUTOFF

DISCLOSURE

This invention relates generally as indicated to a ring former and cutoff and more particularly to a high speed machine and method for the manufacture of rings.

BACKGROUND OF THE INVENTION

In the manufacture of rings of various types, strip stock is fed through a forming mill to impart to the ring stock the desired sectional shape. The stock then passes through a bender which then coils the stock into a ring or helix condition. In order to sever the stock of the desired size with any degree of accuracy, flying cutoffs are usually employed.

Flying cutoffs are well known in the art and the dies thereof are accelerated to the speed of the work in order to make the cut. After the cut is made the dies are stopped and returned to the original position to make the next cut. Flying cutoffs require complex controls and also require a great amount of energy, particularly if the cutoff is of any size, to accelerate the dies, make the cut, stop the dies, and then return them to the original position. Moreover, when forming rings, the cutoff and die may require to travel in a circular path, further complicating the drives involved.

With flying cutoffs the cycle of operation is normally lengthened to permit the acceleration, the cut, the stop, and return of the original position. Accordingly, flying cutoffs limit the productivity of the ring forming machine.

SUMMARY OF THE INVENTION

It has been found that a stationary cutoff can be employed in ring forming machines if the stock is formed into a helix and the turns of the helix between the cutoff and the ring former are permitted to expand and contract to compensate for the momentary delay in the travel of the stock which results from the use of a stationary cutoff die.

Accordingly, the present invention provides a machine and method for forming rings which utilizes a continuous ring former which causes the stock to assume the form of a helix having a number of turns. The leading end of the helix after forming a plurality of free turns passes through a drive roll set, through a stationary cutoff die and into a sizing hoop of slightly larger diameter than the turns of the helix. The free end of the helix engages a stop with the drive roll set causing the free end of the helix which encompasses one complete circle to expand within the sizing hoop. The sizing hoop is provided with sensing means which detects the expansion of the turn of the helix therein to energize the cutoff to sever the free end of the helix with the momentary halt of the stock at the die causing the helix between the cutoff and the former to expand or unwind. When the severed end of the helix is removed or falls free, the drive roll set again drives the new leading end of the helix through the cutoff die at a speed sufficient to return or wind the helix to its original condition. The expansion and contraction of the helix is within the elastic limits of the stock formed and coiled.

The sizing hoop may readily be removed and replaced with a hoop of different size so that different size rings may be formed.

With the present invention, a lower cost machine having greater circumferential accuracy for the formation of the rings is achieved.

It is accordingly a principal object of the present invention to provide a ring forming machine utilizing a stationary cutoff.

Another principal object is the provision of a ring forming machine and method which coils the stock into the form of a helix with the turns of the helix between the cutoff and former expanding and contracting to compensate for the momentary halt of the stock during the cutoff.

A further important object is the provision of a ring former and cutoff machine and method which utilizes a drive roll set in association with a stationary cutoff die which drives the free end of the stock through the die and into a sizing hoop.

Another important object is the provision of a replaceable sizing hoop into which the free end of the helix is driven with expansion of the helix within the sizing hoop initiating the cutoff stroke.

Another object is the provision of an expansion hoop in connection with a cutoff die wherein the size of the work within the hoop is detected to initiate the cutoff stroke.

Yet another important object is the provision of a ring former and cutoff of low cost and maintenance.

Still another important object is the provision of a ring former and cutoff having greatly increased productivity with less moving components.

It is also an important object to provide a ring former and cutoff which can readily be converted to the manufacture of rings of different sizes.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a perspective view of a complete line for forming rings in accordance with the present invention;

FIG. 2 is an enlarged elevation partially broken away and in section of the coiler and cutoff of the present invention;

FIG. 3 is a view taken substantially on the line 3—3 of FIG. 2 on a reduced scale;

FIG. 4 is an enlarged front elevation of the coiler and cutoff as seen from the line 4—4 of FIG. 2;

FIG. 5 is an enlarged section of the drive roll set as taken from the line 5—5 of FIG. 4;

FIG. 6 is a schematic electrical and pneumatic diagram illustrating the sensors which trigger the cutoff; and FIG. 7 is a schematic isometric view of the coiler and cutoff of the present invention.

DETAILED DESCRIPTION OF THE DRAWINGS

Referring now to the drawings and more particularly to FIG. 1, there is illustrated a complete forming line for forming rings in accordance with the present invention. The illustrated line is for forming bicycle wheels rims but it will be appreciated that the present invention may be utilized for any hoop or ring type product such as barrel retainers, automobile wheel trim rings, or other type of ring products.

The stock being formed may be, for example, a flat folded tubular element such as the aforenoted bicycle wheel rim which is seam welded. Strip stock S from the uncoiler 10 passes through a leveler 11 and into a punch press 12 through a festoon or loop 13. The punch press 12 may place holes in the stock for a variety of purposes such as affixing spokes or creating drain holes for the interior of the flat folded tube. From the punch 12 the stock passes through a further loop or festoon 14 and into the forming mill 15. In the forming mill the stock is folded on itself and formed to the sectional configuration of a bicycle wheel rim. The stock then passes through seam welder 16 which welds the edges of the strip together forming the completed formed or flattened tubular configuration of the rim.

From the welder the stock then passes through sizing roll sets 18 and 19 into coil former 20. The coil former 20 includes main top and bottom pinch rolls 22 and 23, respectively projecting in cantilever fashion from housing 24. A somewhat smaller bending roll 25 is secured by adjustment 26 to a bracket 27 which is in turn secured to the underside of projecting frame 28 mounted on top of the housing 24. The bending roll 25 is downstream of the nip of the rolls 22 and 23. Upstream of the nip are two screw-down reaction rolls 30 and 31 mounted on the plate 32 projecting from the housing 24. The rolls 30 and 31 keep the stock horizontal and from bowing upwardly or teetering at the nip of the rolls 22 and 23. A deflection plate extends at the edge of the path of the stock so that as the stock is bent beyond its elastic limit, it forms the initial turn 36 of a helix shown generally at 37.

As the helix is formed it extends axially of the bottom roll 23 and is supported on a rolling arbor 40 extending therefrom. The rolling arbor 40, like the helix 37 projects toward the viewer as seen in FIGS. 2, 3 and 4. The rolling arbor for the most part has a smooth exterior diameter. However, it is provided with slightly projecting end flange 42 and an inwardly spaced flange 43 forming a track therebetween. Such flanges serve as a locater for the helix turn passing over the top of the rolling arbor as seen at 44.

Both the rolling arbor and the helix 37 extend axially from the former 20 into the window 46 of frame 47 of cutoff 48. The frame 47 includes a base plate 50 which may be secured to the floor, and a vertically upwardly spaced base plate 51 forming the lower edge of the window 46. The plate 51 extends between side plates 52 and 53. The side plate 52 is bent toward the side plate 53 as indicated at 54. The side plates are interconnected by a relatively thick top plate 55 which completes the opening 46. Stiffening flanges 56 may be provided on the side plates.

Mounted on top of the top plate 55 is a pneumatic power press shown generally at 60 which includes a base plate 61 supported on spacer 62. Projecting upwardly from the base plate are two vertically extending rods 63 and 64 to which are secured the top and bottom plates 65 and 66 of pneumatic piston-cylinder assembly 67. The piston-cylinder assembly may have a relatively large bore such as 20.32 cm. and short stroke such as 2.54 cm.

Projecting below the plate 55 is a stationary die frame 70 to the front lower end of which is secured a further die element 71. Both the die frame and die element are provided with a window seen at 72 in FIG. 2 through which the stock passes. A horizontally extending plate 74 on the bottom of the dies supports guide rolls 75 and 76 immediately upstream of the die opening window 72 to guide the stock into the window of the die.

The rod 78 of the press is connected to a vertically extending plate 79 which is gibbed for sliding movement on the face of the die frame 70 as indicated at 80 and 81. A cutoff blade 82 is secured to the lower end of the plate 79. When the pneumatic press extends, the blade 82 moves through the window 72 formed by the stationary dies severing the stock within the window.

Immediately upstream of the guide rolls 75 and 76 is a drive roll set seen at 86. The drive roll set is seen more clearly in FIG. 4 and in detail in FIG. 5. The drive roll set is mounted on a pad 88 on the interior of the plate 53 and includes a vertically adjustable base plate 89.

Projecting at a downwardly inclined angle from the base plate 89 are side plates 92 and 93. Journaled in the side plate 93 as indicated at 94 is the extension 95 of adapter roll hub 96. A top drive roll 97 is secured to the adapter hub 96 by the fasteners indicated at 98. An air motor 100 is mounted on the side plate 92 by the fasteners 101. The drive shaft 102 of the air motor is keyed to the interior of the hub 96 as indicated at 103.

More closely spaced side plate extensions 105 and 106 are secured to the side plates 92 and 93, respectively. The side plate extensions are slotted at 107 and 108 to receive shaft 109 on which is journaled bottom roll 111. The projecting ends of the shaft 109 may be flattened to receive springs 112 and 113 supported on spring guides 114 and 115, respectively. Each spring guide is mounted on an adjustment screw as seen at 116 and 117, respectively. The adjustment screws are threaded in the housing at 118 and 119 and jam nuts seen at 120 and 121 secure the screws in adjusted position. It is noted that the rolls 97 and 111 are profiled to receive the stock S therebetween, and that only the roll 97 is driven by the air motor 100. The pressure of springs 112 and 113 holds the roll 111 against the stock S and in turn holds the stock S against the roll 97.

It is noted that the air motor could as well be a variable speed electric motor or a hydraulic motor. In any event, the motor 100 is independent of the speed of the line seen in FIG. 1 within certain parameters as hereinafter discussed.

Referring again to FIGS. 2, 3 and 4, it will be seen that the cutoff is provided with a sizing hoop shown generally at 130. The sizing hoop includes a right circular cylindrical band 131 which is not of uniform axial width. The front edge 132 of the sizing hoop seen in FIG. 2 is normal to its axis while the rear edge 133 is in the form of a helix. The beginning and end of the helix edge are interconnected by an axially extending edge immediately downstream of the die as seen at 135. Substantially adjacent the helical inside edge of the sizing hoop is a helical radially inwardly extending flange or guide plate 137. The guide plate 137 starts at 138 as seen in FIG. 4 just inside the stock opening in the die or away from the viewer in FIG. 4, and terminates at 139 outside the die, or toward the viewer. Immediately beyond the termination 139 of the guide plate 137 is a laterally projecting disappearing stop 140 extending from the plate 79.

Secured to the exterior of the sizing hoop are two angle brackets 144 and 145. A connecting plate 146 extends between the angle bracket 144 and angle bracket 147 which is secured to the underside of the top plate 55. Similarly, a connecting plate 148 interconnects angle bracket 145 and angle bracket 149 secured to base plate 51. In this manner the sizing hoop 130 may readily be removed and replaced with a sizing hoop of different diameter.

The cylindrical wall 131 of the sizing hoop is provided with three substantially equally spaced windows through which project flat spring fingers 152, 153 and 154. Each spring finger is secured to the exterior of the hoop as seen at 155.

Also secured to the exterior of the hoop are three microswitches seen at 157, 158 and 159, each of which is adjustably mounted on brackets 160. The microswitches can quickly be very accurately adjusted to obtain precision of the circumference of the final turn of the helix encompassed within the hoop when cut. Each microswitch also includes a roller plunger 161 projecting into the respective window in the hoop and adapted to be moved by contact by the respective spring finger. It is noted that the spring fingers project in a counterclockwise direction as viewed in FIG. 4, which is the direction of movement of the stock.

Also, as seen in FIG. 4, a further switch 163 is provided which includes the plunger 164. The switch 163 detects the diameter of the turns of the helix 37 between the cutoff and the former and is used to control or periodically stop air motor 100 to allow the line speed of the entire line to catch up the cutoff. Also provided in the interior of the helix is a chip chute 166 designed to receive the small chips or severed sections of the stock which result from the cutoff and deflect them axially of the helix 37.

Referring now to FIG. 6, it will be seen that the three microswitches 157, 158 and 159 are in series with cut relay 170 and accordingly all three switches must be closed before the cutoff cycle starts. It is noted that each sensing switch also energizes a different colored warning light as seen at 172, 173 and 174, so the operator can quickly determine which switch is not working.

When all three switches are closed, the relay 170 closes switch 176 energizing solenoid 177 shifting directional valve 178. When the valve 178 is shifted the rod 78 quickly extends to make the cut and at the extended position of the rod, limit switch 180 opens switch 181 to de-energize the relay 170 returning the directional valve to its original position causing the cutting blade to retract.

OPERATION

Strip stock from the uncoiler 10 passes through the punch 12 and the roll former 15 to be formed and then welded by the welder 16 to achieve substantially the configuration seen more clearly in FIG. 5. The stock then passes through the former 20 and is formed into the helix 37. The helix has a diameter somewhat smaller than the diameter of the sizing hoop 130. The coiled rims now in the form of helix 37 are supported on the rolling arbor 40 leading to coils from the coiling device 20 to the cutoff 48. In the illustrated embodiment, the number of free helixes or turns between the coiler and cutoff is seven. It is in these seven free turns of the helix 37 that the cutoff hesitation is absorbed during the severing cycle produced by the actuation of the piston-cylinder assembly 67.

The leading edge of the helix is advanced through the track 44 on the outboard end of the rolling arbor and then through drive roll set 86 in the pressure nip between the rolls 97 and 111. The leading end then passes through the guide rolls 75 and 76 and into the open window of the stationary cutoff die. Just beyond the window the leading end of the stock is guided by the helix guide plate 137 to extend around the inside of the sizing hoop until it engages the stop 140. At this point the air motor 100 is driving the final turn of the helix through the cutoff die and when the leading edge engages the stop the final turn of the helix begins to expand within the sizing hoop. The expansion of the final turn of the helix trips the switches 157, 158 and 159. When all such switches are tripped the relay 170 causes the blade 82 to extend making the cut. The cut, of course, momentarily stops the advance of the stock. The stop hesitates for approximately 1⅝ inches (41.28 mm) of travel when the line is running at approximately 100 feet (30.5 meters) per minute. The 1⅝ inches (41.28 mm.) is divided at approximately ¼ inch (6.35 mm.) per each of the seven turns of the helix 37. Thus, the helix between the former and cutoff expands slightly. During this cutting cycle the air motor 100 goes into a stall condition thereby stopping its propelling action.

The stock which is coiled somewhat undersized advances in a counterclockwise direction as seen in FIG. 4 inside the confining or sizing hoop. As the end of the stock reaches the cutoff die knife line, it is now on the outside of the cutting aperture or window or toward the viewer in FIG. 2. This position is achieved by the helix guide plate 137. The air motor driven pinch rolls 97 and 111 continue to propel the coil swelling it into the sizing band. When the hoop is fully filled and tight, all three limit switches are closed and the cut is made.

During the cut with the air motor 100 in a stall condition, thereby stopping the propelling action, the forming line continues to feed material and the accumulation is absorbed equally by the seven helix turns imparting only a minor swelling in each so that no permanent radius distortion results.

The severed ring bypasses the disappearing stop 140 and contracts to its original diameter which now makes it loose within the sizing hoop. The finished part is ejected to the front or toward the viewer in FIG. 4 for subsequent manufacturing operations. It may simply fall onto a supporting bar 190 seen in FIG. 1 mounted on stand 191. The rings thus formed may be accumulated and subsequently removed for subsequent manufacturing operations such as butt welding.

It is noted that the air motor 100 must feed the stock from the former or coiler at a speed somewhat faster than the output speed of the line. In this manner the air driven feed can catch up and deplete the accumulation that has occurred in the free helix turns during the cut. Although speed matching is not critical and may be done with a simple tachometer, it is noted that switch 163 insures that the air feed does not drive too fast causing the incoming helix turns to assume too small of a diameter. If they do, the switch 163 stops the drive periodically and permits the forming line to catch up. In this manner the line is in some respects self-synchronizing as long as the air speed is reasonably close to but slightly faster than the speed of the forming line.

It will be appreciated that the cutoff element need not be air powered as in the illustrated embodiment. It may be a mechanical press, a saw or other conventional severing device.

It will also be appreciated that the number of free turns of the helix between the former and cutoff is dependent upon the character of the work being processed. In any event, the expansion and contraction of the free turns of the helix between the former and cutoff is limited to the elastic limit distortion of the stock.

It will be further appreciated that the sizing hoop very accurately controls the circumferential accuracy of the ring being formed at very high speed. The ring when expanded into the sizing hoop and cut may actually be less than a full circle, but when released, the cut product may then contract into a ring with the ends overlapped. It will be then expanded when the ends are later joined into a ring of the desired accurate circumference and diameter.

With the present invention, a ring forming machine having substantially higher line speed is provided. The productivity of the line is substantially twice that employed with a flying cutoff. Also, the readily removable and replaceable sizing hoop permits rings of different diameter readily to be formed to a high degree of accuracy. For example, bicycle wheel rims of 27, 26 and 24 inches (68.58, 66.04, and 60.96 cm.) in diameter can be made on the same machine.

What is claimed:

1. A ring forming machine comprising:
   (a) forming meaans for continuously forming ring stock into a helix having a plurality of turns;
   (b) drive means for feeding a free end of said helix through a stationary cutoff die;
   (c) stop means for arresting motion of said helix free end, at least temporarily, to produce radial expansion in at least one turn of said helix;
   (d) means for sensing expansion in said one turn including means for actuating said cutoff die to sever said one turn from the helix upon sensing a predetermined expanded condition of said one turn.

2. A machine as set forth in claim 1 wherein said drive means comprises a drive roll set.

3. A machine as set forth in claim 2 including motor means for said drive roll set operative to drive the stock somewhat faster than the speed of the forming means.

4. A machine as set forth in claim 2 including motor means for said drive roll set operative to stall out during severance of said one turn.

5. A machine as set forth in claim 2 including an air motor for said drive roll set.

6. A machine as set forth in claim 2 wherein said drive roll set comprises a motor drive roll, and a spring loaded roll forming a pressure nip for the stock therebetween.

7. A ring forming machine comprising:
   (a) forming means for continuously forming ring stock into a helix having a plurality of turns;
   (b) drive means for feeding a free end of said helix through a stationary cutoff die;
   (c) stop means for arresting motion in one portion of said helix including means for actuating said cutoff die to sever said one portion from an other portion of said helix;
   (d) means supporting said other helix portion that allows radial expansion in said other helix portion to compensate for a halt in feeding of said helix that occurs during severance of said one helix portion by said stationary cutoff die.

8. A machine as set forth in claim 7 wherein said means supporting the other helix portion comprises a rolling arbor extending from said forming means toward the cutoff die.

9. A machine as set forth in claim 8 including a track on the end of the arbor to position a final turn of the helix thereon.

10. A machine as set forth in claim 7 including a sizing hoop adjacent the cutoff die of a diameter larger than the turns of the helix, and wherein said stop means is operative to engage the free end of the helix to cause the turn of the helix within the hoop to expand when driven by said drive means against said stop means.

11. A machine as set forth in claim 10 including sensing means to sense the conformance of the turn of the helix to the sizing hoop to initiate the cut.

12. A machine as set forth in claim 11 wherein said sensing means comprises a plurality of switches positioned around the sizing hoop.

13. A machine as set forth in claim 12 including means responsive to the tripping of all of the switches to actuate said cutoff die.

14. A machine as set forth in claim 12 wherein each switch is positioned in a window in the hoop and is tripped by a spring finger moved by the expansion of the helix turn to close the window.

15. A machine as set forth in claim 12 wherein said switches are three in number and substantially equally circumferentially spaced around the hoop.

16. A machine as set forth in claim 12 wherein said switches are in series, and each switch when closed energizes a color coded light.

17. A machine as set forth in claim 10 including a helical guide in said sizing hoop to insure the free end hits said stop means.

18. A machine as set forth in claim 10 including means supporting said sizing hoop for ready removal and replacement.

19. A machine as set forth in claim 10 wherein said stop is a disappearing stop means.

20. Ring cutoff apparatus for continuous coiled stock having at least two coils, comprising:
   (a) a stationary die;
   (b) a sizing hoop surrounding at least one coil of said stock after it passes through said die;
   (c) said hoop defining a diameter larger than the diameter of said one coil;
   (d) means for expanding said coil into said sizing hoop including means for actuating said stationary die to sever said coil when said coil is expanded into substantial conformance with said hoop.

21. A cutoff apparatus as set forth in claim 20 wherein said expanding means comprises a stop for arresting motion in a free end of said coiled and drive means operative to drive the stock through the die, into said sizing hoop and against said stop.

22. A cutoff as set forth in claim 21 including a helical guide in said sizing hoop to insure the free end hits the stop.

23. A cutoff as set forth in claim 20 including means supporting said sizing hoop for ready removal and replacement.

24. A cutoff as set forth in claim 21 wherein said stop is a disappearing stop.

25. A cutoff as set forth in claim 20 including sensing means to sense the conformance of the stock to the sizing hoop to initiate the cut.

26. A cutoff as set forth in claim 25 wherein said sensing means comprises a plurality of switches positioned around the sizing hoop.

27. A cutoff as set forth in claim 26 including means responsive to the tripping of all of the switches to initiate the cut.

28. A cutoff as set forth in claim 26 wherein each switch is positioned in a window in the hoop and is tripped by a spring finger moved by the expansion of the stock to close the window.

29. A cutoff as set forth in claim 26 wherein said switches are three in number and substantially equally circumferentially spaced around the hoop.

30. A cutoff as set forth in claim 26 wherein said switches are in series, and each switch when closed energizes a color coded light.

31. Apparatus for producing substantially equally sized individual coils from coil stock, comprising:
  (a) a cutoff die for severing said coiled stock;
  (b) a sizing hoop adjacent said die for receiving one coil of said stock, said sizing hoop defining a diameter larger than the diameter of said coil stock;
  (c) means for radially expanding said one coil into substantial conformance with said sizing hoop;
  (d) means for actuating said cutoff die to sever said one coil upon sensing substantial conformance of said coil with said sizing hoop.

32. The apparatus of claim 31 wherein said sensing means comprises a plurality of switches positioned around the sizing hoop.

33. The apparatus of claim 31 including means responsive to the tripping of all of the switches to initiate the cutoff die.

34. The apparatus of claim 31 wherein each switch is positioned in a window in the hoop and is tripped by a spring finger moved by the expansion of the stock to close the window.

35. The apparatus of claim 31 wherein said switches are three in number and substantially equally circumferentially spaced around the hoop.

36. A ring forming machine comprising:
  (a) a continuously running mill including means operative to form strip stock into ring stock having a predetermined cross section;
  (b) said mill further operative to coil said ring stock into a helix having a plurality of turns;
  (c) a stationary cutoff die for severing said helix into individual rings of accurate circumference;
  (d) means for advancing a turn of said helix through said cutoff die; and,
  (e) means for expanding said turn including a sensing means for actuating said cutoff die to sever said turn from said helix, upon sensing a predetermined expanded condition of said turn.

37. A machine as set forth in claim 36 including means responsive to the actuation of the cutoff die to cause the turns of the coil to expand between the mill and cutoff die.

38. A machine as set forth in claim 37 wherein the number of turns of the coil between the mill and the cutoff die are sufficient to permit expansion of the turns within the elastic limit of the ring stock.

39. A machine as set forth in claim 38 including drive means for the coil operative to remove the expansion following the severance of said one coil.

40. A machine as set forth in claim 39 wherein said drive means includes an air motor drive which stalls out during the servance of said turn.

41. A machine as set forth in claim 39 including means responsive to a minimum diameter of the turns of the coil momentarily to stop said drive means.

42. A method of forming accurately sized rings from ring stock, comprising the steps of:
  (a) continuously advancing the ring stock through a former to form the ring stock into a helix having at least two turns;
  (b) feeding a free turn of the helix through a stationary cutoff die;
  (c) severing said free turn of said helix with said cutoff die upon sensing a predetermined size condition of said free turn without interrupting the advancing of said stock, by permitting turns of said helix upstream of said cutoff die to expand slightly to compensate for a halt in motion of said helix at said cutoff die while severing said free turn.

43. A method as set forth in claim 42 including the step of feeding the free end through the die and into a sizing hoop against a stop.

44. A method of claim 43 including the step of continuing to feed the stock after the free end has hit the stop to enlarge the stock within the sizing hoop.

45. A method as set forth in claim 43 including the step of detecting the conformance of the stock to the sizing hoop to initiate the cut.

46. A method as set forth in claim 44 including the step of drive feeding the free end faster than the forming of the helix to remove the expansion between cuts.

47. A method as set forth in claim 46 including the step of stopping the feeding during the cut.

48. A method as set forth in claim 46 including the step of momentarily stopping the feeding in response to a detected minimum diameter of the turns of the helix to permit the former to catch up.

49. A method as set forth in claim 42 including the step of providing a sufficient number of free turns of the helix between the former and cutoff die so that such expansion is within the elastic limits of the ring stock.

50. A method as set forth in claim 49 including the step of permitting the cut time length increase in the helix to be equally absorbed by the number of turns of the helix between the former and cutoff die.

* * * * *